United States Patent
Dasher

(10) Patent No.: US 12,518,476 B2
(45) Date of Patent: Jan. 6, 2026

(54) SYSTEMS AND METHODS FOR EMULATING A USER DEVICE IN A VIRTUAL ENVIRONMENT

(71) Applicant: Adeia Guides Inc., San Jose, CA (US)

(72) Inventor: Charles Dasher, Lawrenceville, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/979,075

(22) Filed: Nov. 2, 2022

(65) Prior Publication Data
US 2024/0144588 A1 May 2, 2024

(51) Int. Cl.
*G06T 17/00* (2006.01)
*G06F 9/455* (2018.01)
*G06Q 30/0601* (2023.01)

(52) U.S. Cl.
CPC .............. *G06T 17/00* (2013.01); *G06F 9/455* (2013.01); *G06Q 30/0643* (2013.01)

(58) Field of Classification Search
CPC ..... G06T 17/00; G06Q 30/0643; G06F 9/455; G06F 9/45504
USPC ............................................................ 345/419
See application file for complete search history.

(56) References Cited

U.S. PATENT DOCUMENTS

| | | | | |
|---|---|---|---|---|
| 5,673,403 A | * | 9/1997 | Brown | G06F 9/452 715/788 |
| 7,626,569 B2 | * | 12/2009 | Lanier | G06F 3/012 348/42 |
| 2014/0208272 A1 | * | 7/2014 | Vats | G06F 3/04845 715/852 |
| 2018/0350144 A1 | * | 12/2018 | Rathod | G06Q 20/3224 |
| 2019/0019429 A1 | * | 1/2019 | Palberg | G09B 9/05 |
| 2019/0302255 A1 | * | 10/2019 | Clark | G06T 19/003 |

* cited by examiner

*Primary Examiner* — Hai Tao Sun
(74) *Attorney, Agent, or Firm* — HALEY GUILIANO LLP

(57) ABSTRACT

A user device associated with a user interacting with a virtual environment is identified. Using an emulation application, a virtual instance of the user device is launched. User preferences for the user device, retrieved from user data, are then applied to the virtual instance of the user device. A graphical representation of the virtual instance of the user device is then generated for presentation to the user within the virtual environment.

20 Claims, 9 Drawing Sheets

SYSTEMS AND METHODS FOR EMULATING A USER DEVICE IN A VIRTUAL ENVIRONMENT

BACKGROUND

This disclosure is directed to emulating a user device in extended reality (XR) sessions. In particular, techniques are disclosed for identifying user devices to be emulated and for synchronizing a virtual instance of a user device with the corresponding real user device.

SUMMARY

The disclosed techniques enable a virtual instance, within an XR environment, of a real-world user device (sometimes referred to as a "virtual device"). The XR environment may be a virtual reality (VR) environment or augmented reality (AR) environment. The virtual device may use existing sensors incorporated into XR devices (e.g., XR headsets or XR controllers), and it may use data collected or generated by these XR devices (e.g., data representing tracked hand movements) to augment or inform virtualized hardware functionality contained within the virtual device emulator. Generally speaking, an "emulator" is hardware or software that enables a computer system (e.g., a general-purpose computer system) to behave like or imitate another computer system (e.g., a particular make and model of a phone, running a particular version of a particular operating system). An emulator may be capable of emulating multiple different system (e.g., multiple different iPhone models, multiple different Android phones, etc.). When a computer system implements the emulator to emulate a given system, the computer system implements an application or set of code corresponding to that given system (e.g., representing the given system's hardware, firmware, operating system, etc.). The running application or set of code may be referred to as a virtual device or an instance. Thus, an emulator capable of emulating multiple different systems can produce multiple different instances, each corresponding to one of the different systems (e.g., each having different makes, models, and/or operating systems). Generally, the instance is capable of executing any applications executable by the computer system that is being emulated. The described techniques enable users of disparate XR systems to purchase or license a virtual device as a component that can be incorporated into a 3D XR application within an Integrated Development Environment (IDE). In one example, a user may visit a "Virtual Store" within a VR or AR environment, where they can purchase or download a virtual device. If desired, a new virtual device may be "onboarded" or linked to a user's existing cloud services account. In an embodiment, a virtual device synchronizes its application state or data with an existing physical device (e.g., a smartwatch) when that physical device is physically proximate to the VR or AR headset (e.g., using one of the described cloud synchronization techniques).

The disclosed techniques address numerous VR or Metaverse issues. While people use the term "Metaverse" to refer to a number of related concepts, the term generally refers to a paradigm where people and objects exist and interact in "virtual worlds." Using VR or AR headsets, people can access these virtual worlds and interact with others (e.g., via avatars representing users). Numerous VR projects aim to provide users with experiences approximating what they might find offline. As the Metaverse evolves, users will increasingly expect their virtual experiences to mirror real life experiences. The disclosed techniques address some of these expectations. For example, a user may want to use a virtual phone that corresponds to his real phone. The disclosed techniques enable this user experience. These techniques benefit mobile phone manufacturers (for example) as well as end users. For example, mobile phone manufacturers have an incentive to keep users within a "walled garden" of their branding. The disclosed techniques enable mobile phone manufacturers to provide end-users with a virtual version of the user's device, keeping the user within a familiar ecosystem and enabling the user to express brand loyalty to his device in the Metaverse.

Different emulators may be needed for different hardware configurations. Emulators which run on one piece of hardware and emulate another often rely on the hardware of the first device, such as a communication component, which may be used by the emulator as a virtual device (not within the 3D environment, but a virtual device as the emulator sees it). For example, an emulator running on a PC may use the PC's WiFi hardware to emulate an ethernet adapter which when exposed to the Operating System (OS) contained in the emulator ROM or image, may look to both the OS and the end user as an ethernet adaptor. As each VR/AR headset manufacturer is different, and each VR/AR headset incorporates different hardware devices (such as different cameras, different WiFi modules or different Inertial Systems, compasses etc.). While the OS or ROM image that emulators "run" are the same, the actual emulator must match the hardware on which it runs (similar to having a Java runtime that is different for Android, Mac OS and Windows but all able to execute the same Java binaries). Therefore, when loading an emulator within a VR or AR environment, it is necessary to load the correct one that matches the hardware/runtime of the VR or AR headset.

A user's hardware configuration may not initially be known to the VR or AR environment, just as a web browser is unknown to a website until detected. It is therefore advantageous to detect the hardware capabilities of a visiting headset to determine what emulators can be run using those hardware capabilities. The end user may then be presented with "virtual devices" (e.g., provided by emulators and having 3D object representations, such as a watch band or display) that can run on the headset from which they are visiting. Additionally, the disclosure shows a virtual store presenting these "virtual devices" (emulators) which are capable of running on their hardware (e.g., headset). Additionally, a virtual device may be a "twin" or "clone" of real devices which the user already owns and is inventoried into a device management system (e.g., Apple iCloud). When used in this context, the terms "twin" and "clone" generally refer to an emulation of a physical device owned by the user that behave in an identical manner to the physical device in real time. This includes displayed content, receipt of communications, reaction to user input, etc. This disclosure takes this notion a step further to enable a user to add all of their devices in one interaction. Once a user has acquired the "virtual device," they may then onboard it into their device management account. Lastly, it may be desirable for the "virtual device" to mirror a real device, and this disclosure describes a system and method for accomplishing this.

As further described in the detailed description, a hardware emulator, container or sandboxed code execution module may be incorporated into, or otherwise associated with, a 3D object as an executable code container or module. The container or module may be executed in a secure or isolated manner within a VR or AR headset runtime. In an embodiment, the described virtual device instance or virtual device relies on, or takes advantage of, several components, such as an emulator, a 3D graphical representation of the device being emulated, or a video texture area. In an embodiment, an emulator is capable of loading ROMs, OS Images, code modules, "images," or other executable code that may run on virtualized hardware. Virtualized hardware may be emulated by the emulator.

In an embodiment, an XR runtime environment may make available (to a virtual device emulator) data derived from sensors of XR devices (e.g., worn or used by the user). Example data includes hand or eye tracking data. The data may be made available to the "virtual device" emulator via a hardware API or as a generalized hardware abstraction API. Depending on the embodiment, an abstraction API may or may not be common across a plurality of AR or VR hardware devices or manufacturers to provide a common interface to AR or VR headset sensor data. Data provided by the API may be derived from a base or origin data from a sensor. For example, a VR or AR headset may calculate hand tracking or controller tracking data based on sensor input and apply a transform or other function to derive additional data to be exposed to the virtual device such providing a "precision" location of a virtual device within a VR or AR environment. Similarly, a virtual location within a VR or AR environment may be exposed to the virtual device in a similar way as GPS data is provided by GPS receivers in real devices today. The tracking data, GPS data, or data derived from either the tracking data or the GPS data, may be used by the virtual device or for applications running within the virtual device's emulator (e.g., a photo application or map/navigation application).

As the Metaverse evolves from a single application running on a particular hardware platform such as the Oculus Quest 2 to a standards-based model (in the same way as web browsers process HTML), users will visit or experience environments which are hosted not within a single application running on a headset, but rather through an application that "parses" and "interprets" a standards-based markup language for 3D environments and interactions where the "environment" resides on third-party computing resources in a similar way to how the World Wide Web works today. "Virtual Stores" will exist to provide real products and services as well as digital products and services. Manufacturers of devices such as Apple or Samsung, given their past histories, will want to provide or sell virtual versions of their real products. As such, it may be advantageous to provide different runtime versions of virtual devices based on the VR or AR hardware of the visiting user. For example, Apple may create a virtual version of its Apple Watch for use within an AR or VR environment. The virtual device may differ based on the make and model of the headset, such that a user wearing an Oculus Gear 2 headset may require a different version of a virtual Apple Watch than a user wearing a Samsung VR headset.

When an application developer uses a third-party "developer store" within an Integrated Development Environment (IDE) to acquire virtual devices for use within a VR or AR application, the version of the "virtual device" used in the application may be chosen either automatically or manually based on the targeted operating system or target hardware runtime such as when a developer is targeting a specific headset such as the HTC Vive. Accordingly, development of any given emulator is often targeted to the chosen device and/or operating system. Multiple emulators for the same user device must therefore be developed for each combination of device and operating system.

In an embodiment, when a user visits a virtual store within the VR or AR environment, the environment (refer to herein as a portal) may request or detect properties of the hardware such as the make and model of the hardware, the operating system running on the hardware, or runtime versions or capabilities of the hardware. Once the portal has detected the hardware properties, it may adjust its metadata or markup to match the capabilities of the visiting VR or AR hardware. Further, the virtual store may use the detected properties to filter or provide versions of "virtual devices" which are capable of "running" on the detected hardware.

Additionally, the virtual store may present devices which are virtual versions of real devices that a user owns or has listed within their device management account (e.g., relying on data provided via a cloud system). For example, if a user's device management account indicates that the user has access to a real Apple Watch Series 7, the virtual store may present a virtual version of the Apple Watch Series 7 for purchase or download. Further, the virtual store may allow a user to "import" or acquire virtual devices for all their devices with a single interaction such as a prompt or checkmark or click.

Once a user has acquired a "virtual device," to the system may "onboard" the newly acquired virtual device into a user's cloud account (e.g., an iCloud or Google account). Note, that if a user has authenticated a relevant account (e.g., an Apple account), a virtual device may be automatically associated with the account. If desired, the virtual device may be synchronized with existing real devices. In the case where the virtual device has been automatically associated with a user's device management account, the configuration, onboarding, and user setup may occur without any user input or interaction.

In the case where no prior user authentication occurs (e.g., when the virtual device is acquired from an unauthorized third-party or when the virtual device is acquired by virtually cloning or twinning an existing real device) it may be advantageous to onboard the newly acquired virtual device into the user's cloud device management account. In the case where the onboarding is initiated from within a VR or AR environment, the virtual device may request a user to authenticate (e.g., log into) their device management account via a user prompt. In a case where the VR environment has access to the user's device management account, the user might be authenticated without a user prompt. Once authenticated, the onboarding of the virtual device may occur automatically. If desired, the onboard may occur with the assistance of prompts for information and user input responsive to the prompts.

In scenarios where it is desirable to avoid passing user authentication information from within the VR environment, the virtual device may display a nonce, QR code, or other graphical element that can be viewed or captured by a VR or AR virtual camera. This image (or the resultant data) may be transmitted by the VR or AR headset to a device management API (such as to an iCloud device management API endpoint) or to an application running on an external device over a communication link such as Wi-Fi or Bluetooth where the image may be processed, and the "virtual device" may be onboarded to the users account.

In scenarios where the virtual device acquisition is not initiated from an interaction involving the user's device management account (such as selecting a virtual device based on existing devices as described above) but rather, based on the virtual twinning or cloning of a real device in the absence of a device management account, an application running on the real device (or a nonce or QR code physically attached to a real device) may be scanned using camera(s) incorporated into a VR or AR headset, via an application running on a third device such as a camera application running on a mobile phone or via a user interaction with an application or user setting on the real device (such as a user selection within a settings application on a real Apple Watch).

A virtual device may, on its own (e.g., via emulated hardware such as a virtual network interface with its own IP address), initiate and execute communication necessary for the function of the virtual device. In this case, communication occurs. However, it may be desirable for communication (due to security, hardware, or other requirements, for example) to pass communications through an intermediary device (e.g., a nearby mobile device). In this case, a communication network or bridge may be established locally between the VR or AR headset (using for example Wi-Fi or Bluetooth) to enable the "virtual device" to communicate through the external device.

In scenarios where it is desirable for the virtual device to be reachable via a phone number, a VR or AR headset may expose interfaces allowing for direct communication between the headset and telephonic systems providers (such as when the VR or AR headset incorporates a cellular communications component). This would allow the virtual device to receive and transmit communications, using the headset's interfaces. A virtual device may present itself (e.g., enter a pairing mode) to an external device (e.g., a mobile device) as a "hands-free" device allowing the virtual device to respond to, initiate, or control an external device.

In scenarios where the virtual device is a clone or twin, device data including (for example) sensor data (real or virtual) or application state data may be exchanged directly between a virtual device and a real device if the device is reachable by the VR or AR headset (for example of a Wi-Fi or Bluetooth link) or via a cloud synchronization where data is sent to, and received from, a cloud data store or service. In this case, part or all of a virtual device's or a real device's application state may be mirrored in either direction.

In one embodiment, sensors of the XR headset (such as controller tracking, hand tracking, camera input, inertial measurement module, microphone, ambient light sensor) are exposed by the XR headset to the virtual device hardware emulator via an API, driver or other type of enablement. In another embodiment, sensors (such cameras, inertial measurement modules, microphones, ambient light sensors, touch recognition sensors) of a real device are exposed by the real device to the virtual device hardware emulator via a direct, external communications like Wi-Fi or Bluetooth. For example, the real device may open a communications port or other interface through which data from the sensors can be transmitted to or requested by the emulator. If desired, an update to an application or device state within a device management account may also be used to expose the sensors to the emulator.

In an embodiment, the virtual device is created as a stand-alone 3D object with an embedded executable runtime, emulator, or container. The virtual device may incorporate a "screen" into a 3D object used to represent the device to the user. The emulator may render the graphical interface of the emulated device in the area of the screen. The 3D object may be re-used by application developers as an object within a 3D VR or AR application. The 3D object may be purchasable or made available within a VR or AR development environment where various object settings and permissions made be set such as requiring activation, permitting customizations, or allowing synchronization with a real device.

In an embodiment, a user may browse or virtually visit a VR or AR "virtual store or portal" to purchase or acquire the virtual device directly for use within an AR or VR environment without the virtual device having to have been previously added by an application developer. In some embodiments, a user may choose to "import" or acquire digital devices for all or part of the devices associated with a user account such as an Apple iCloud account.

The virtual device may be a stand-alone device. For example, its data may not be linked to an existing real device. The virtual device may be added to a user's device management account from within a XR environment. If desired, it may be added by way of scanning an existing real device, QR code or other nonce. The virtual device may also be a digital clone or twin, in that the data and application state are synchronized between the virtual device and the real device. Note that the synchronization is bi-directional and that actions on either the real or virtual device are mirrored.

Systems and methods are described herein for emulating a user device in a virtual environment. A user device associated with the user is identified. Using an emulation application, a virtual instance of the user device is launched. User preferences for the user device, retrieved from user data, are then applied to the virtual instance of the user device. A graphical representation of the virtual instance of the user device is then generated for presentation to the user within the virtual environment.

Identifying the user device associated with the user may be accomplished by receiving a request to generate a virtual instance of a user device and, in response, retrieving data describing a plurality of user devices associated with the user from a user profile. From the data, a device type of each associated user device is determined. If an emulation application for the device type of a particular user device is available, the particular user device may be identified as the user device to be emulated.

In some embodiments, the device capabilities of the XR device through which the user interacts with the virtual environment are determined. At least one emulation application for the identified user device is then identified. However, not all emulation applications for the identified user device may be compatible with the XR device, given its capabilities. It may, therefore, be determined which of the identified emulation applications can run on the XR device, based on the device capabilities. If an emulation application can run on the XR device, it may be retrieved and used to launch the virtual instance of the user device.

A user device may be identified for emulation based on a user's purchase history. The completion of a purchase of a new user device may be detected. For example, the user's purchase history may be monitored. Data associated with new purchase records can be used to determine whether any of the corresponding purchases was for a new user device. In another example, the user's location within a virtual environment is monitored (e.g., by determining the provider or operator of a server from which the currently rendered virtual content is being served to the user). If the user enters a virtual store that sells user devices and a transaction is detected, the system may determine that the user purchased a new user device. The user device may be identified from the purchase history.

A virtual instance of a user device may be launched in response to determining that the user is not currently located in proximity to the user device. This may be useful to the user if, for example, the user device is a smartphone and the user receives a call or message while not in proximity to the smartphone. If the user is proximate to the user device, a virtual instance of the user device may not be needed, and system resources may be conserved by not launching a virtual instance of the user device. In some embodiments, a running virtual instance of the user device may be terminated in response to the user returning to a location in proximity to the user device. In such cases, the virtual instance may not be terminated if the user is currently interacting with the virtual instance of the user device. If, however, the user is currently interacting with the virtual instance of the user device and begins to physically interact with the real user device, the virtual instance of the user device may be terminated. To facilitate termination, the system may synchronize states between the virtual instance of the user device and the real user device (e.g., prior to termination of the virtual instance of the user device). This can help ensure a seamless transition between interaction with the virtual instance of the user device and interaction with the real user device.

In some embodiments, a version of the virtual instance launched using the emulation application is selected (e.g., by indicating in a launch command the type of XR device) based on the XR device that is providing an interactive interface for the virtual environment. For example, a different version of the virtual instance may be launched for a hand-held AR display than is launched for a head-mounted VR display.

If desired, an intermediate device may communicate with the user device and the XR device. The intermediate device may be used to provide user data for the user device. For example, a smart watch may be paired with a smartphone. The XR device may receive user data for the smart watch from the smartphone. The user data for the smart watch may already be stored on the smartphone and transmitted to, or retrieve by, the XR device. Alternatively, the smartphone or other intermediate device may request the user data in response to a request from the XR device. The smartphone or other intermediate device may then retrieve the most current user data for the user device and transmit it to the XR device.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
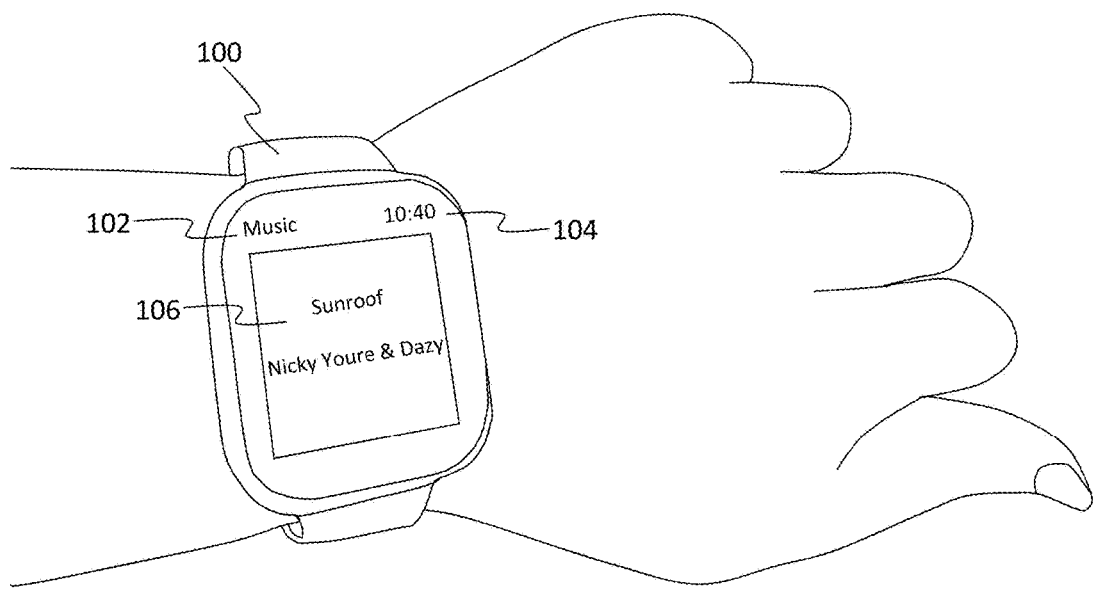
FIG. 1 shows an example of a user device being emulated in a virtual environment, in accordance with some embodiments of the disclosure.
Figure 1:
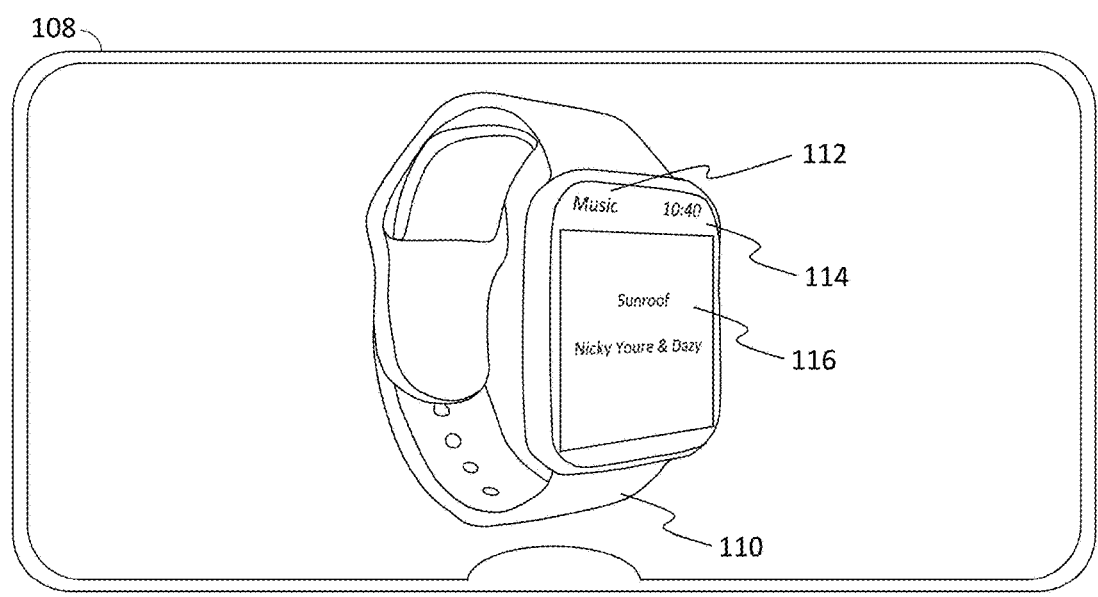

FIG. 1 shows an example of a user device being emulated in a virtual environment, in accordance with some embodiments of the disclosure. A user may have a user device, such as smart watch 100. Other examples of user devices may include laptops, tablets, smartphones, televisions, or any other network-connected device that can be configured, personalized, or customized by the user. The user may, for example, be listening to music through smart watch 100. The display of smart watch 100 may show indication 102 of the function currently in use (e.g., "Music"), current time 104, and information 106 about the music currently being played back. When the user enters a virtual environment using extended reality (XR) device 108, virtual instance 110 of smart watch 100 may be generated for presentation to the user. A virtual instance of a user device may be an emulation of the user device that mirrors the user device in both appearance and functionality and can be used by the user within a virtual environment as though it were the user device. This includes sending and receiving messages and/or phone calls, accessing personal data, communicating with other user devices, etc. Virtual instance 110 may be launched automatically in response to the proximity of smart watch 100 to XR device 108 (e.g., smart watch 100 is on the user's wrist). In some embodiments, virtual instance 110 is launched in response to a pairing between smart watch 100 and XR device 108 (e.g., Bluetooth pairing), or in response to a lack of connectivity between smart watch 100 and XR device 108 after pairing (e.g., smart watch 100 is turned off, broken, or out of range of connection with XR device 108). Virtual instance 110 may also be launched in response to a user input or selection to do so.

Once launched, virtual instance 110 may synchronize with a current or last known state of smart watch 100. The display of virtual instance 110 therefore shows the same information as smart watch 100, such as function indicator 112, current time 114, and currently playing music information 116.

Figure 2:
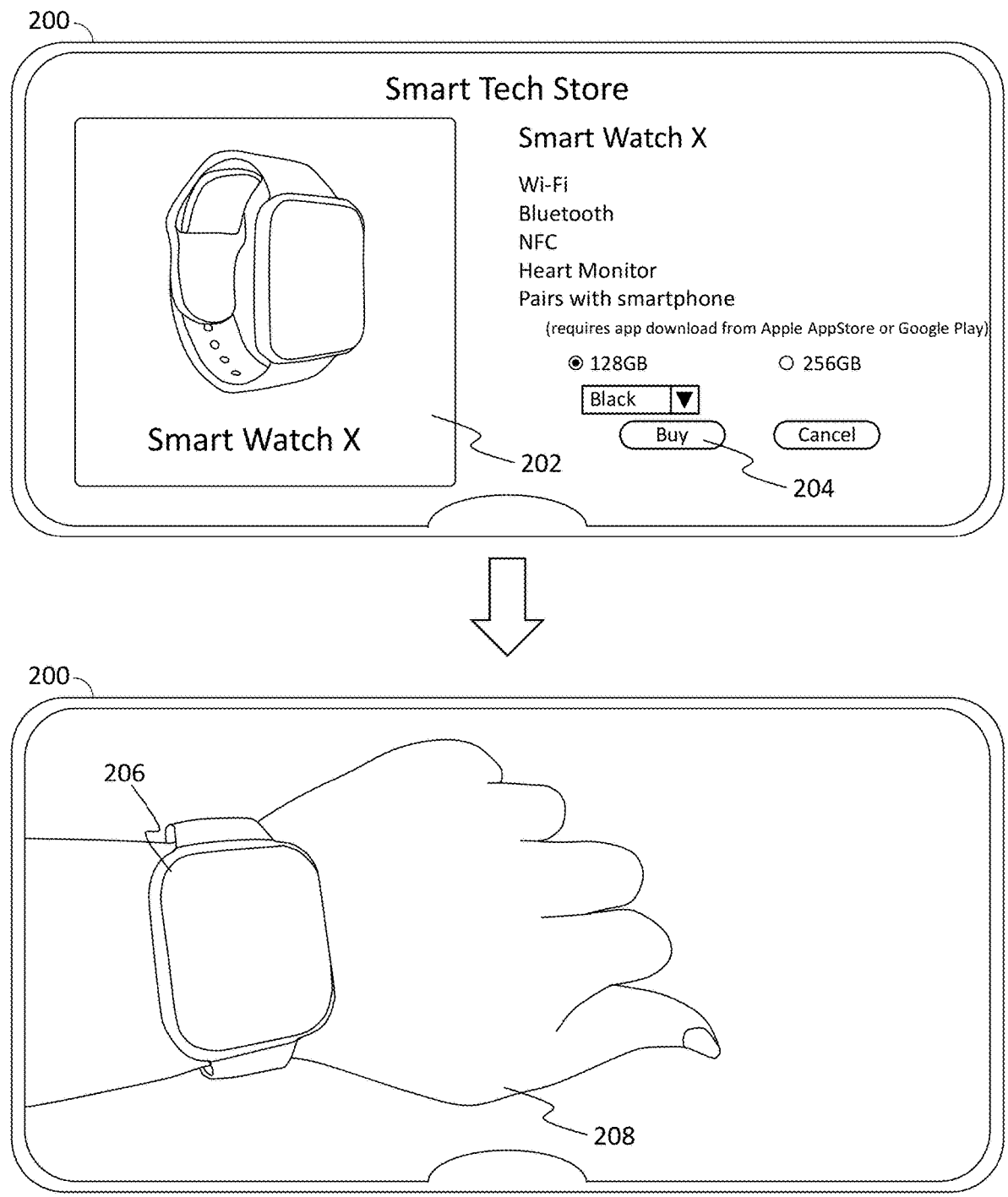
FIG. 2 shows an example of a new user device purchased within a virtual environment and being emulated after the purchase is complete, in accordance with some embodiments of the disclosure.

FIG. 2 shows an example of a new user device purchased within a virtual environment and being emulated after the purchase is complete, in accordance with some embodiments of the disclosure. Using XR device 200, the user may visit a virtual store from which a new user device can be purchased. The new user device may be smart watch 202. Smart watch 202 may be purchasable from the virtual store as a real device that will be shipped to the user, or as a virtual device only. In either case, once the purchase of smart watch 202 is complete (e.g., the user selects option 204 to buy it), virtual instance 206 of smart watch 202 may be launched. When the user looks at their arm, virtual representation 208 of their arm may be wearing virtual instance 206 of smart watch 202. If the user purchased a real device, any settings selected by the user during setup of virtual instance 206 may be synchronized with the real device when the user later activates it.

Figure 3:
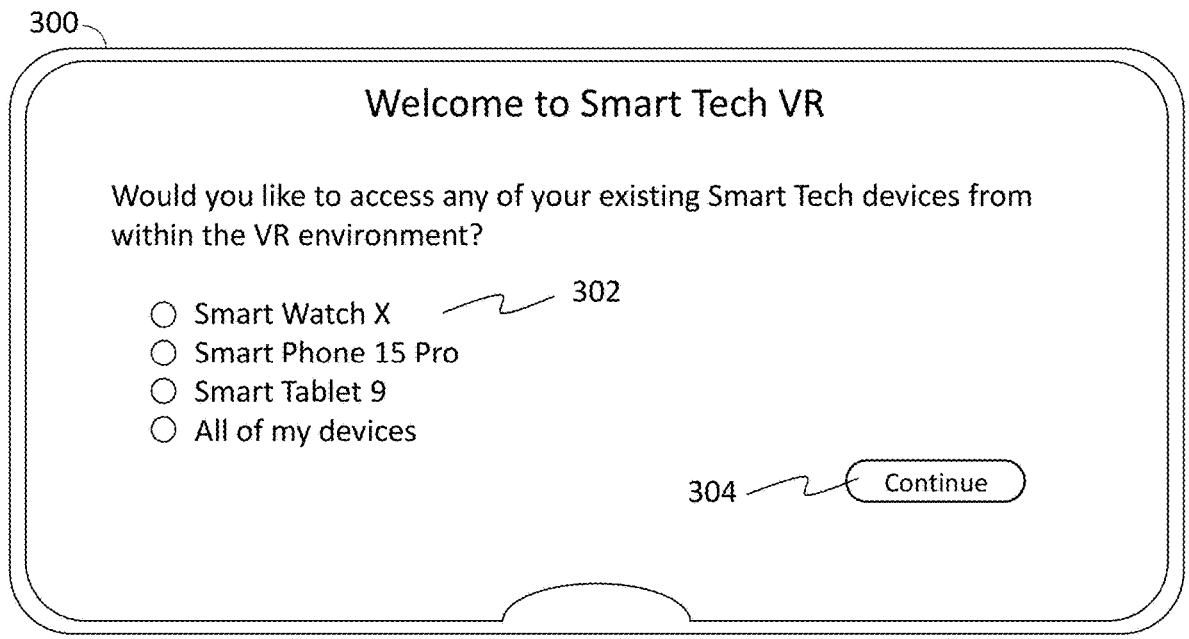
FIG. 3 shows an example user interface from which a user can select a user device to be emulated in a virtual environment, in accordance with some embodiments of the disclosure.

FIG. 3 shows an example user interface from which a user can select a user device to be emulated in a virtual environment, in accordance with some embodiments of the disclosure. When beginning a session on XR device 300, the user may be presented with an option to emulate any one or more devices associated with the user for which emulation applications are available. An emulation application is a software component designed to mimic the behavior and functionality of a particular type of user device. For example, the user may have a smart phone, smart watch, tablet, and laptop. Emulation applications may be available for the smart phone, smart watch, and tablet. Accordingly, the user is presented with options 302 to select one or all of the smart phone, smart watch, and tablet to emulate. Once the user selects to continue (using button 304), XR device 300 launches virtual instances of each selected device.

Figure 4:
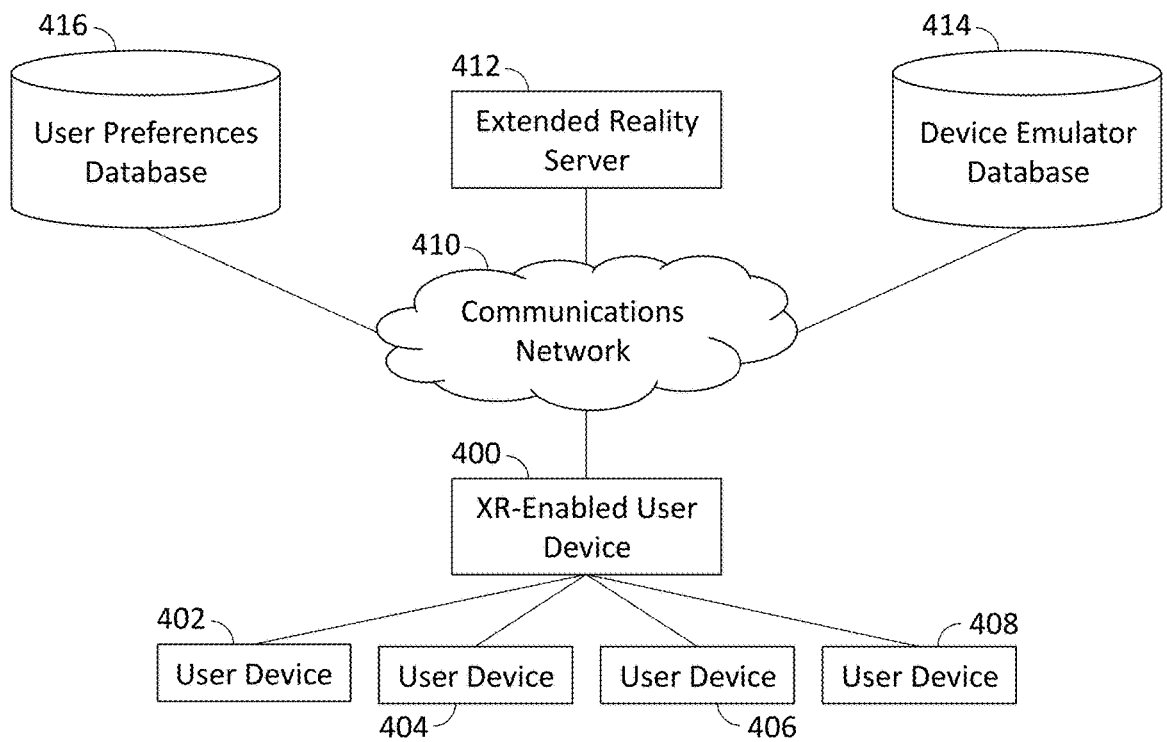
FIG. 4 is a diagram of a computing environment in which user devices may be emulated in a virtual environment, in accordance with some embodiments of the disclosure.

FIG. 4 is a diagram of a computing environment in which user devices may be emulated in a virtual environment, in accordance with some embodiments of the disclosure. XR-enabled user device 400 may be paired with, in communication with, or associated with the same user account as user devices 402, 404, 406, and 408. Each of user devices 402, 404, 406, and 408 may be a device that can be emulated in a virtual environment. XR-enabled user device 400 may retrieve state information, configuration data, and any other personalized settings from any user device chosen to be emulated in order to synchronize a virtual instance of that user device with the real user device.

XR-enabled user device 400 receives, via communications network 410, XR content from extended reality server 412. Extended reality server 412 may be any suitable server device configured to provide real-time streaming content in any format suitable for XR displays. When encoding content for delivery to XR-enabled user device 400, extended reality server 412 may include tags, anchor points, or other data or metadata indicating positions within the XR content at which virtual instances of user devices may be inserted. For example, an anchor point (or insertion point) may be set on the wrist of a user's avatar to allow a virtual instance of a smart watch to be inserted as though it were being worn on the wrist of the avatar. An insertion position may also be placed in a pocket of the user's avatar for a virtual instance of a smart phone, while an insertion point may be placed on a desk, table, or other flat surface for insertion of a virtual instance of a tablet or laptop.

To launch a virtual instance of a user device, an appropriate emulation application is needed. Emulation applications for various devices may be stored in device emulator database 414. In some embodiments, multiple emulation applications for each user device may be stored in device emulator database 414, wherein each version is built, compiled, and/or optimized for different combinations of versions of the user device (e.g., different operating system variants) and XR device types and configurations. For example, a given user device may have three different operating system variants (e.g., version 1.0, 2.0, and 3.0), and XR devices may be available from two different manufacturers (e.g., Apple and Google), each using their own hardware and software. Therefore, there may be as many as six emulation applications available for the user device. XR-enabled user device 400 may request the appropriate emulation application, based on its own configuration and the configuration of the user device. User customizations, preferences, and settings (collectively, user data) may be retrieved from user preferences database 416 and applied to the virtual instance of the user device to match the appearance and functionality of the virtual instance of the user device with that of the real user device. In some embodiments, the emulation application is run on extended reality server 412 and the virtual instance of the user device integrated into the XR content transmitted to XR-enabled user device 400.

Figure 5:
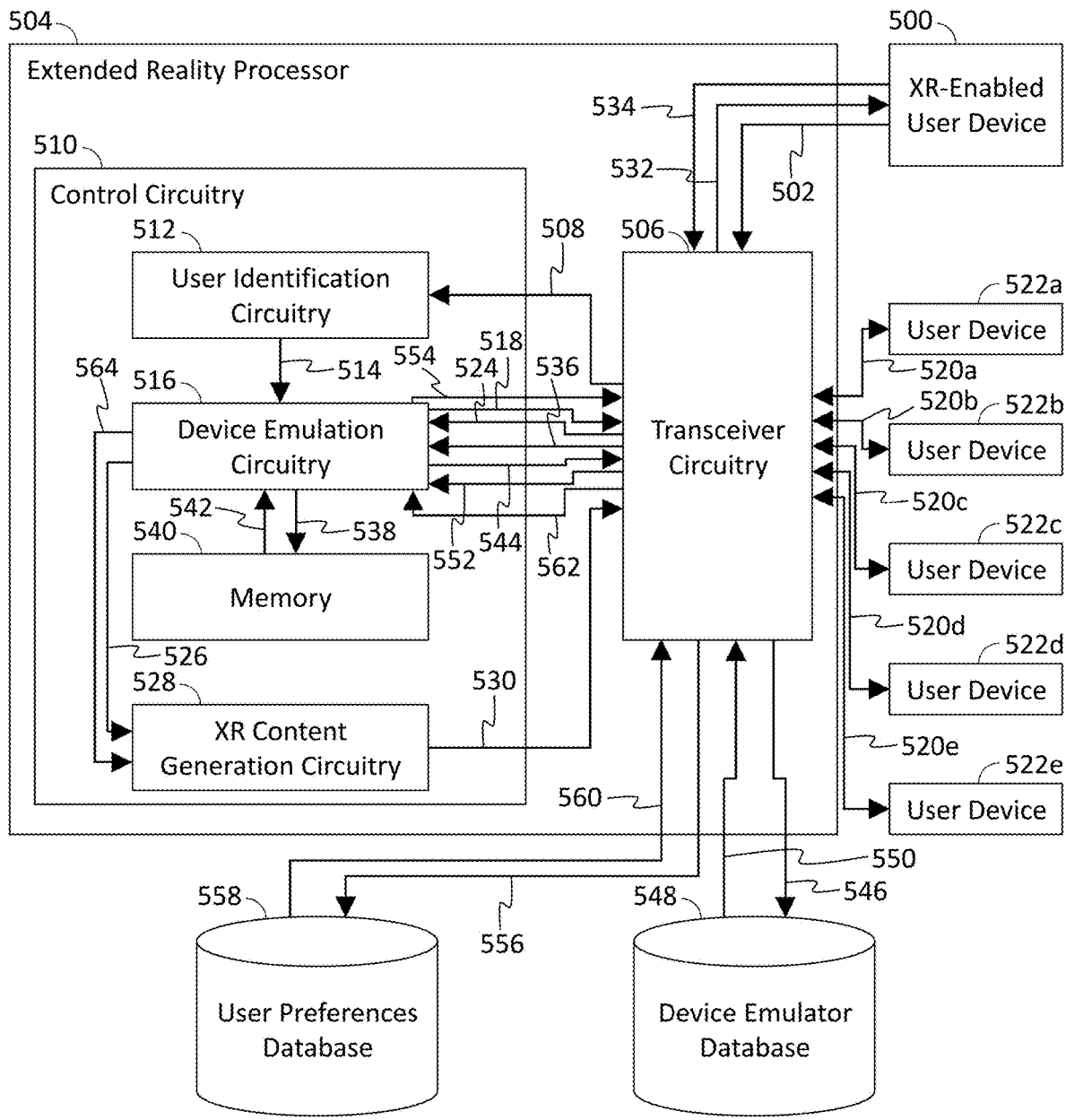
FIG. 5 is a block diagram showing components and dataflow therebetween of an extended reality processor configured to emulate a user device in a virtual environment, in accordance with some embodiments of the disclosure.

FIG. 5 is a block diagram showing components and dataflow therebetween of an extended reality processor configured to emulate a user device in a virtual environment, in accordance with some embodiments of the disclosure. XR-enabled user device 500 first accesses an XR environment by transmitting 502 an identifier of the user to extended reality processor 504. Extended reality processor 504 may be integral to XR-enabled user device 500 or may be a remote server. Extended reality processor 504 receives the user identifier using transceiver circuitry 506. Transceiver circuitry 506 may comprise a network connection over which data can be transmitted to and received from remote devices, such as an ethernet connection, Wi-Fi connection, mobile broadband interface, or connection employing any other suitable networking protocol, or it may be a data transfer bus or other component configured to transfer data between components of a single system, such as XR-enabled user device 500. Transceiver circuitry 506 may also include a Bluetooth connection or other short-range wireless data connection through which user devices may communicate or be paired with XR-enabled user device 500.

Transceiver circuitry 506 in turn transmits 508 the user identifier to control circuitry 510, where it is received using user identification circuitry 512. Control circuitry 510 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). User identification circuitry 512 authenticates the user. For example, user identification circuitry 512 may compare the user identifier with a list of known user identifiers. If a matching known user identifier is found, the user is authenticated. In some embodiments, previous session data for the authenticated user is retrieved, and preferences for the authenticated user may be applied to XR-enabled user device 500.

User identification circuitry 512 transmits 514 an authentication message or other signal, including the user identifier, to device emulation circuitry 516. Device emulation circuitry 516 may comprise any circuitry suitable to execute a device emulation application, including dedicated CPUs, GPUs, FPGAs, ASICs, or any other suitable circuitry. Device emulation circuitry 516 transmits 518 a request for user devices associated with the identified user to transceiver circuitry 506. Transceiver circuitry 506 may be in periodic or constant communication, via communication paths 520*a*-*e*, with a plurality of user devices 522*a*-*e*. In response to the request, transceiver circuitry 506 transmits 524 data describing each of the connected or paired user devices. The data may include unique device identifiers (e.g., MAC addresses, IP addresses, IMEI numbers, etc.), as well as device information such as the device type, operating system, power status, applications running on the device, applications installed on the device, etc.

In some embodiments, device emulation circuitry 516 may transmit 526 a list of user devices to XR content generation circuitry 528. XR content generation circuitry 528 may generate for presentation to the user a graphical representation of the list of user devices. This may be a text-based list or graphical icons representing user devices. XR content generation circuitry 528 transmits 530 the list, as XR content, to transceiver circuitry 506, which in turn transmits 532 the XR content to XR-enabled user device 500. A user may input a selection at XR-enabled user device 500 of which user device(s) to emulate. The selection is then transmitted 534 to extended reality processor 504, where it is received at transceiver circuitry 506 and relayed 536 to device emulation circuitry 516.

Once a user device has been selected for emulation, device emulation circuitry 516 retrieves an appropriate emulation application. In some embodiments, device emulation circuitry 516 transmits 538 a request to memory 540 for the appropriate emulation application. Memory 540 may be an electronic storage device. As referred to herein, the phrase "electronic storage device" or "storage device" should be understood to mean any device for storing electronic data, such as random-access memory, read-only memory, hard drives, optical drives, solid state devices, quantum storage devices, or any other suitable fixed or removable storage devices, and/or any combination of the same. The request may include an identifier of a specific emulation application or may include specifications of the user device to be emulated. In response to the request, device emulation circuitry 516 receives 542 the emulation application for the user device. In some embodiments, more than one user device may be selected for emulation. Accordingly, more than one emulation application may be requested. In some embodiments, emulation applications are stored in a remote server or database. Device emulation circuitry 516 transmits 544 the request for the emulation application to transceiver circuitry 506, which in turn transmits 546 the request to device emulator database 548. In response to the request, extended reality processor 504 receives 550, from device emulator database 548, the requested emulation application at transceiver circuitry 506. Transceiver circuitry 506 then transmits 552 the emulation application to device emulation circuitry 516.

For the virtual instance of a user device to mirror the experience of the real user device, device emulation circuitry 516 must apply any user preferences, configurations, settings, and personalizations to the emulated user device. Device emulation circuitry 516 transmits 554 a request for user preferences, configurations, settings, and personalizations to transceiver circuitry 516, which in turn transmits 556 the request to user preferences database 558. As users change their device configurations, settings, etc., the changes may be stored in user preferences database 558. Thus, user preferences database 558 contains the most recent set of user preferences, configurations, settings, etc., for each user device. In response to the request, user preferences database 558 transmits 560 the appropriate data to extended reality processor 504, where it is received using transceiver circuitry 506. Transceiver circuitry 506 in turn transmits 562 the data to device emulation circuitry 516.

Device emulation circuitry 516 then launches the emulation application and applies the user configurations, settings, personalizations, etc., to the newly launched virtual instance of the user device. Device emulation circuitry 516 transmits 564 physical parameters of the emulated user device, as well as data representing content to be displayed on the emulated virtual device, to XR content generation circuitry 528. XR content generation circuitry 528 uses the data transmitted from device emulation circuitry 516 to render the virtual instance of the user device for presentation to the user. The rendered virtual instance of the user device is transmitted 530, as part of the XR content stream, to transceiver circuitry 506, which in turn transmits 532 the XR content stream to XR-enabled user device 500.

Figure 6:
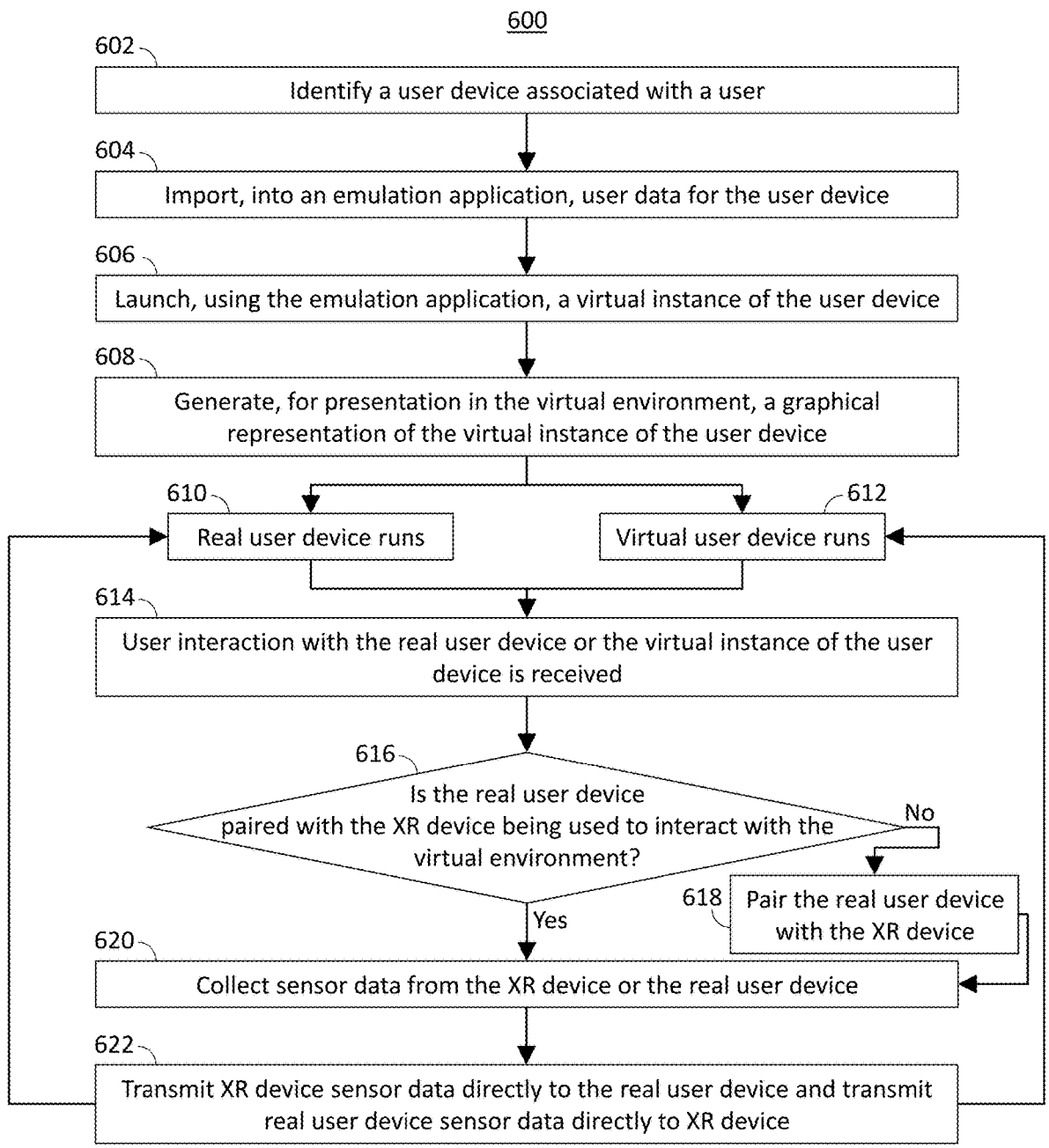
FIG. 6 is a flowchart representing an illustrative process for emulating a user device in a virtual environment, in accordance with some embodiments of the disclosure.

FIG. 6 is a flowchart representing an illustrative process 600 for emulating a user device in a virtual environment, in accordance with some embodiments of the disclosure. Process 600 may be implemented on control circuitry 510. In addition, one or more actions of process 600 may be incorporated into or combined with one or more actions of any other process or embodiments described herein.

At 602, control circuitry 510 identifies a user device associated with the user. The user device may be any network-connected user device, such as a smartphone, smart watch, television, tablet, laptop, IoT device, etc. To identify a user device, control circuitry 510 may access a user profile associated with the user and retrieve a list of associated devices. Each user device associated with the user may have a flag or other indicator value specifying whether the device is to be emulated when the user is interacting with a virtual environment. If a device flag or identifier indicates that it is to be emulated, control circuitry 510 may retrieve a unique identifier of the user device (e.g., a MAC address, IP address, IMEI number, phone number, etc.) and poll (e.g., transmit a request for information) the user device for its configuration data, settings, system-level information, and any other data needed to accurately emulate the user device. Other methods of identifying user devices are discussed below in connection with FIG. 7.

At 604, control circuitry 510 imports, into an emulation application, user data for the device. Control circuitry 510 may retrieve (or receive in response to a request or poll as discussed above) configuration data, settings, system-level information, and other data about the user device to be emulated. Control circuitry 510 may also retrieve an appropriate emulation application for the user device. For example, control circuitry 510 may identify a make, model, and operating system version of the user device. Control circuitry 510 may then determine which emulation application to use from a pool of emulation applications. For example, three different emulation applications may be available for a given make and model of smart watch (e.g., an Apple Watch Series 8). Each of the three emulation applications may be based on a different operation system version (e.g., watchOS 9.0, watchOS 9.0.1, and watchOS 9.0.2). If the user device to be emulated is an Apple Watch Series 8 running watchOS 9.0.1, control circuitry 510 will retrieve the emulation application for the Apple Watch Series 8 that is based on watchOS 9.0.1. Control circuitry 510 then imports the data retrieved from, or about, the user device into the emulation application. This results in the emulated device mimicking the user device in appearance and functionality. In some embodiments, emulation applications may be available for different models of the user device, and operating system emulation applications are separately available. In such cases, control circuitry 510 retrieves the emulation application for the model of user device and separately retrieves the emulation application for the operating system version currently installed on the user device.

At 606, control circuitry 510 launches, using the emulation application, a virtual instance of the user device. For example, control circuitry 510 applies the data from the user device to the emulation application and begins running the emulation application to create the virtual instance of the user device. Control circuitry 510 may register the virtual instance of the user device on a service provider network (e.g., a mobile broadband network, a local Wi-Fi network, etc.) so that the virtual instance of the user device achieves the same connectivity as the user device and receives the same notifications as the user device.

At 608, control circuitry 510 generates, for presentation in the virtual environment, a graphical representation of the virtual instance of the user device. Using physical parameters of the user device stored in the emulation application and user customizations, preferences, and settings retrieved from the user device, control circuitry 510 generates an XR object that matches the appearance of the user device and with which the user can interact within the virtual environment. Control circuitry 510 then adds, embeds, overlays, or otherwise includes the XR object in the virtual environment. Placement of the XR object may depend on the type of user device being emulated. For example, a smart watch may be anchored to a wrist of the user's avatar within the virtual environment, while a smartphone or tablet may be placed on a table, desk, or other flat surface. If the user device is currently located on the user's person, the placement of the XR object may be anchored to the position of the user device. For example, an XR object of a smart watch currently being worn on the user's left wrist may be anchored to the left wrist of the user's avatar. Similarly, if a smartphone is currently located in the user's right pocket, the corresponding XR object may be anchored to the side of the user's right leg and initially hidden from view. Control circuitry 510 may track the position of the smartphone and determine, based on its position and/or the user's movements, whether the user has taken the smartphone out of their pocket. If so, control circuitry 510 may change the anchor for the XR object from the user's leg to the user's hand and make the XR object visible.

At 610, the real user device may be running while simultaneously, at 612, the virtual instance of the user device is running. At 614, user interaction with the real user device or the virtual instance of the user device is received. For example, the virtual environment may be an AR environment, which allows the user to see and interact with real-world objects through a transparent head-mounted display. The user may therefore be able to pick up a user device and interact with it. A virtual instance of the same user device may also be running, and the user may interact with the graphical representation of the virtual instance of the user device in either an AR or VR environment. Inputs received from the user via the user device or the virtual instance of the user device, as well as movements thereof, may be monitored by, or routed by the user device to, control circuitry 510.

At 616, control circuitry 510 determines whether the real user device is paired with the XR device through which the user is interacting with the virtual environment. For example, each user device may be paired with the XR device through a Bluetooth connection. Control circuitry 510 may retrieve a list of devices currently paired with the XR device. Control circuitry 510 may then compare an identifier of the user device with the list of paired devices to determine whether the user device is currently paired. If not ("No" at 616), then, at 618, control circuitry 510 pairs the user device with the XR device. This may be accomplished by establishing a connection between the user device and the XR device, or by prompting the user to enable communication between the user device and the XR device.

After pairing the user device with the XR device, or if the user device was already paired with the XR device ("Yes" at 616), at 620, control circuitry 510 collects sensor data from the XR device or the real user device. This may be any type of sensor data, including position, orientation, acceleration, velocity, location, power state, transmission state, visual output state, audio output state, etc. At 622, control circuitry 510 transmits XR device sensor data directly to the user device and user device sensor data directly to the XR device. In this way, the virtual instance of the user device and the real user device can remain in synchronized states. After transmission of the sensor data, processing returns to 610 and/or 612.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
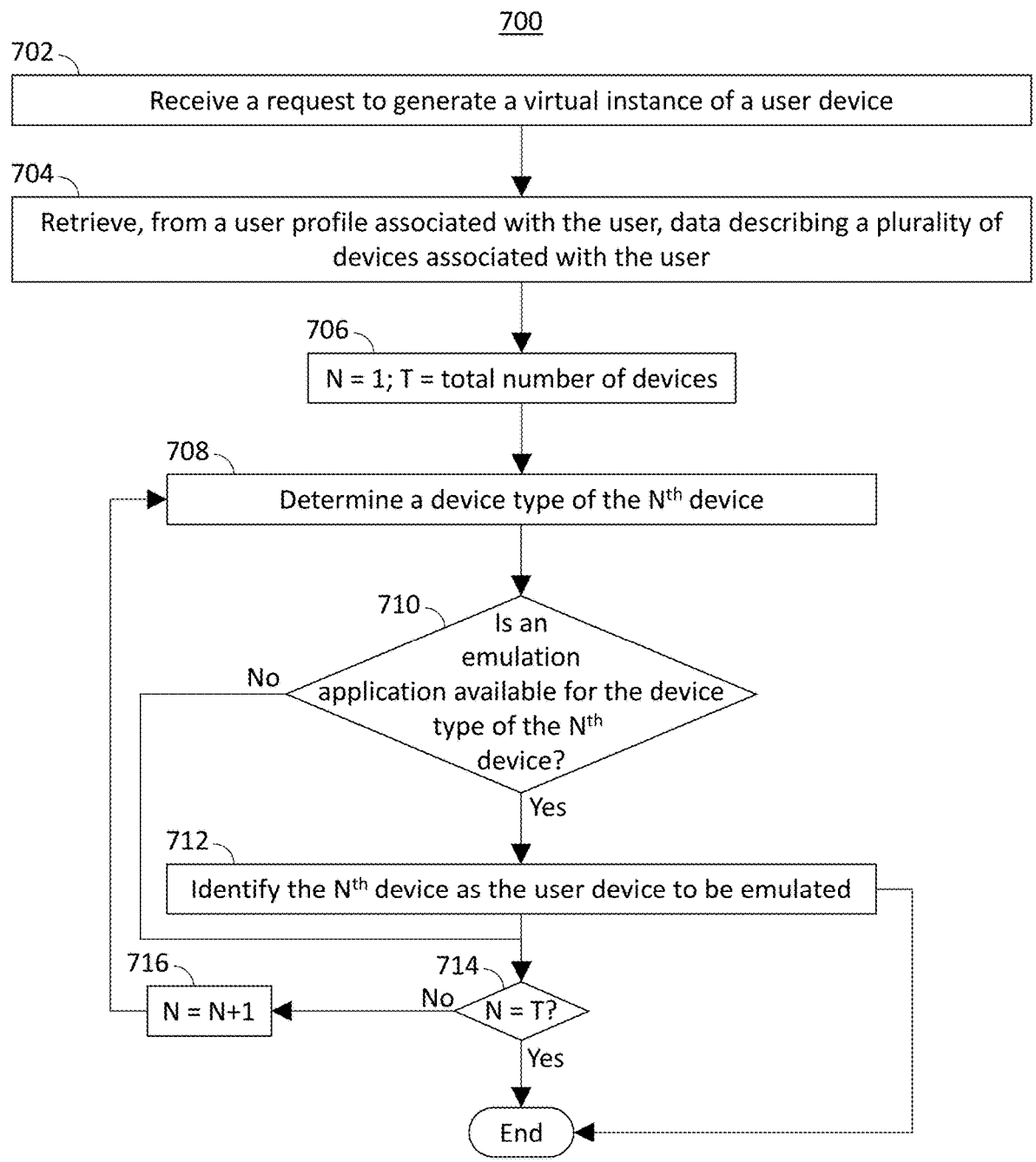
FIG. 7 is a flowchart representing an illustrative process for identifying a user device to be emulated in a virtual environment, in accordance with some embodiments of the disclosure.

FIG. 7 is a flowchart representing an illustrative process 700 for identifying a user device to be emulated in a virtual environment, in accordance with some embodiments of the disclosure. Process 700 may be implemented on control circuitry 510. In addition, one or more actions of process 700 may be incorporated into or combined with one or more actions of any other process or embodiments described herein.

At 702, control circuitry 510 receives a request to generate a virtual instance of a user device. For example, control circuitry 510 may receive, via the XR device, an input from the user to emulate one or more user devices. Alternatively or additionally, control circuitry 510 may retrieve user preferences for the user and determine that the user always requests to emulate at least one user device. At 704, control circuitry 510 retrieves, from a user profile, data describing a plurality of devices associated with the user. For example, the user profile may include a list of devices associated with the user's account, such as a smart watch, smartphone, tablet, laptop, etc.

At 706, control circuitry 510 initializes a counter variable N, setting its value to one, and a variable T representing the total number of devices listed in the user profile. At 708, control circuitry 510 determines a device type of the $N^{th}$ device. For example, control circuitry 510 may determine that the $N^{th}$ device is a smartphone. In some embodiments, control circuitry 510 may determine a specific make and model of the $N^{th}$ user device in addition to the device type.

At 710, control circuitry 510 determines whether an emulation application is available for the device type of the $N^{th}$ device. For example, emulation applications may be available for smartphones and smart watches, but not laptops. If the $N^{th}$ device is a laptop, no emulation application will be available. If, however, the $N^{th}$ device is a smartphone or smart watch, an emulation application may be available for the device. If an emulation application is available for the device type of the $N^{th}$ device ("Yes" at 710), then, at 712, control circuitry 510 identifies the $N^{th}$ device as a user device to be emulated. If no emulation application is available for the device type of the $N^{th}$ device ("No" at 710), or after identifying the $N^{th}$ device as a user device to be emulated, at 714, control circuitry 510 determines whether N is equal to T, meaning that it has been determined whether an emulation application is available for the device type of every device associated with the user. If N is not equal to T ("No" at 714), then, at 716, control circuitry 510 increments the value of N by one and processing returns to 708. If N is equal to T ("Yes" at 714), then the process ends. Virtual instances of each user device identified as a user device to be emulated may then be launched using appropriate emulation applications.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
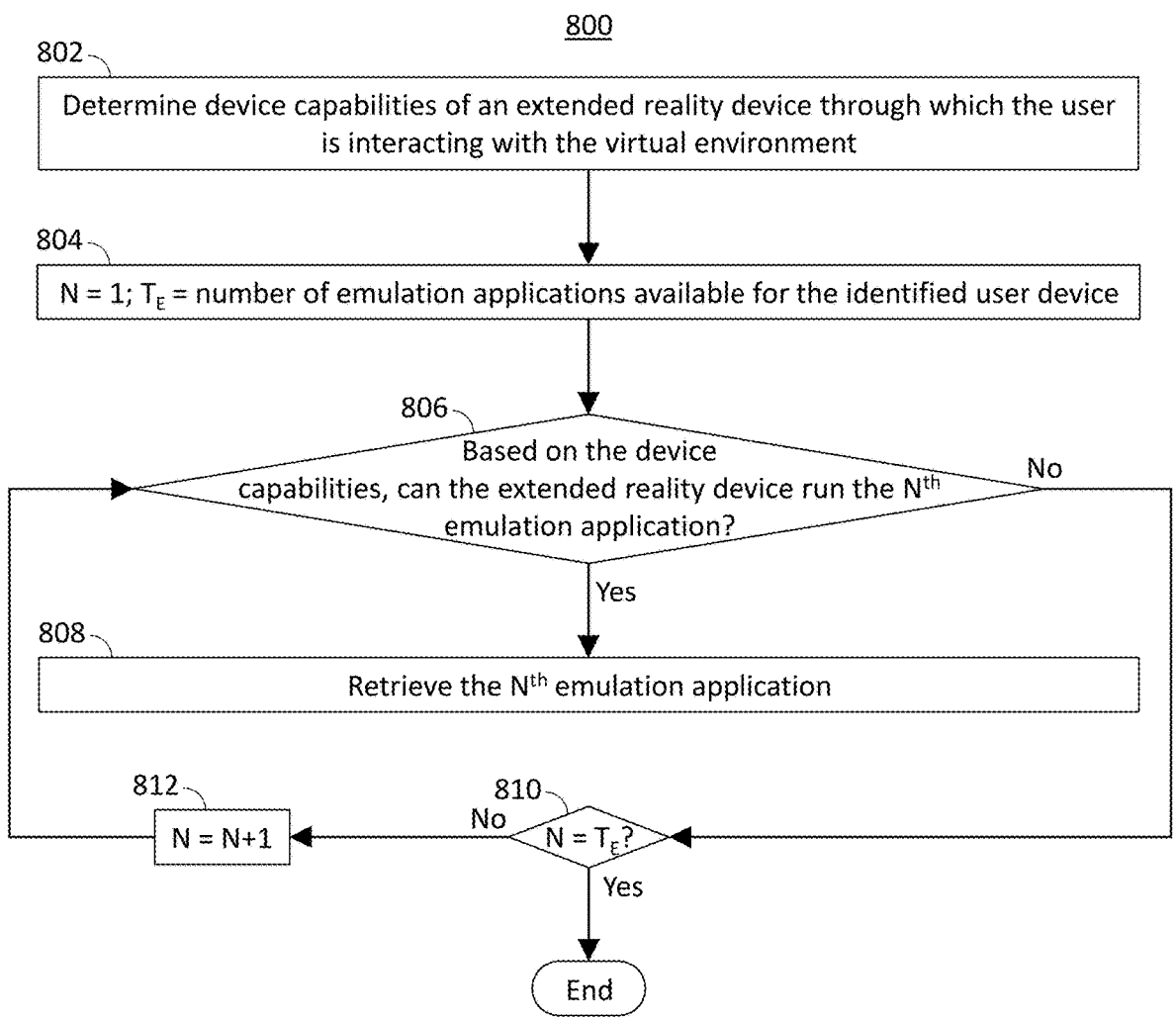
FIG. 8 is a flowchart representing an illustrative process for retrieving an emulation application for a user device, in accordance with some embodiments of the disclosure.

FIG. 8 is a flowchart representing an illustrative process 800 for retrieving an emulation application for a user device, in accordance with some embodiments of the disclosure. Process 800 may be implemented on control circuitry 510. In addition, one or more actions of process 800 may be incorporated into or combined with one or more actions of any other process or embodiments described herein.

At 802, control circuitry 510 determines device capabilities of an extended reality device through which the user is interacting with the virtual environment. For example, control circuitry 510 retrieves configurations data for the XR device, including technical specifications such as CPU specifications, GPU specifications, RAM, video RAM, system architecture, and operating system. At 804, control circuitry 510 initializes a counter variable N, setting its value to one, and a variable $T_E$ representing the number of emulation applications available for the identified user device.

At 806, control circuitry 510 determines, based on the device capabilities, whether the XR device can run the $N^{th}$ emulation application. For example, a number of emulation applications may be available for a user's smart watch, with each emulation application having been built and/or optimized for a specific operating system, system architecture, or system resource availability. Control circuitry 510 may compare the device capabilities with the requirements of the $N^{th}$ emulation application to determine whether the XR device meets the specifications for which the $N^{th}$ emulation application was built/optimized. If so ("Yes" at 806), then, at 808, control circuitry 510 retrieves the $N^{th}$ emulation application. For example, control circuitry 510 may retrieve the emulation application from a database of emulation applications (e.g., device emulator database 548).

If the XR device cannot run the $N^{th}$ emulation application ("No" at 806), then, at 810, control circuitry 510 determines whether N is equal to $T_E$, meaning that all available emulation applications for the identified user device have been checked. If N is not equal to $T_E$ ("No" at 810), then, at 812, control circuitry 510 increments the value of N by one, and processing returns to 806. If N is equal to $T_E$ ("Yes" at 810), then the process ends. In some embodiments, if none of the available emulation applications can run on the XR device, control circuitry 510 may generate for presentation to the user a notification that no compatible emulation applications are currently available.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
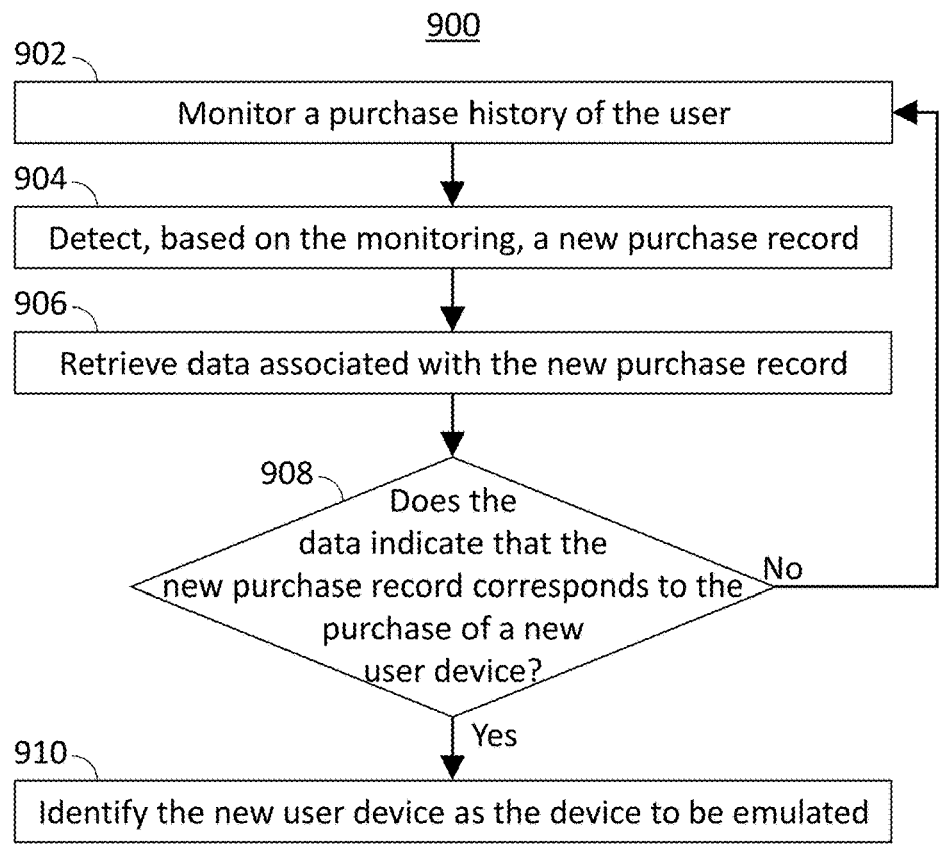
FIG. 9 is a flowchart representing an illustrative process for identifying a user device to be emulated based on user purchase history, in accordance with some embodiments of the disclosure.

FIG. 9 is a flowchart representing an illustrative process 900 for identifying a user device to be emulated based on user purchase history, in accordance with some embodiments of the disclosure. Process 900 may be implemented on control circuitry 510. In addition, one or more actions of process 900 may be incorporated into or combined with one or more actions of any other process or embodiments described herein.

At 902, control circuitry 510 monitors a purchase history of the user. For example, a user profile may include purchase history data. Control circuitry 510 may periodically retrieve one or more of the most recent purchase records reflected in the purchase history. In some embodiments, control circuitry 510 retrieves all purchase records since that last retrieval time. For example, if purchase records were last retrieved at time $T_1$, control circuitry 510 may retrieve, at time $T_2$, all purchase records for purchases made between time $T_1$ and time $T_2$. In other embodiments, a feed may be enabled between control circuitry 510 and the user's purchase history such that, every time a purchase record is added to the user's purchase history, a notification of that purchase record is sent to control circuitry 510. At 904, control circuitry 510 detects, based on the monitoring, a new purchase record.

In response to detecting the new purchase record, at 906, control circuitry 510 retrieves data associated with the new purchase record. The associated data may include an identifier of what was purchased, such as a product name, UPC, or other unique identifiers. In some embodiments, a transaction identifier may be used by control circuitry 510 to access a transaction record from the associated vendor to identify the product. At 908, control circuitry 510 determines whether the data indicate that the new purchase record corresponds to the purchase of a new user device. For example, the data associated with the purchase record may indicate that the user purchased a smart watch and may further indicate the make and model of the smart watch. In some cases, the data may include a unique product identifier, such as a UPC. Control circuitry 510 may use the product identifier to look up the product in a product database or on the Internet.

If the data does not indicate that the user purchased a user device ("No" at 908), then processing returns to 902 where control circuitry 510 continues to monitor the user's purchase history. If the data does indicate that the user purchased a user device ("Yes" at 908), then, at 910, control circuitry 510 identifies the new user device as the device to be emulated. It is noted that the user may purchase a real user device to be shipped to them or may purchase a virtual-only version of the user device to be used only in virtual environments.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
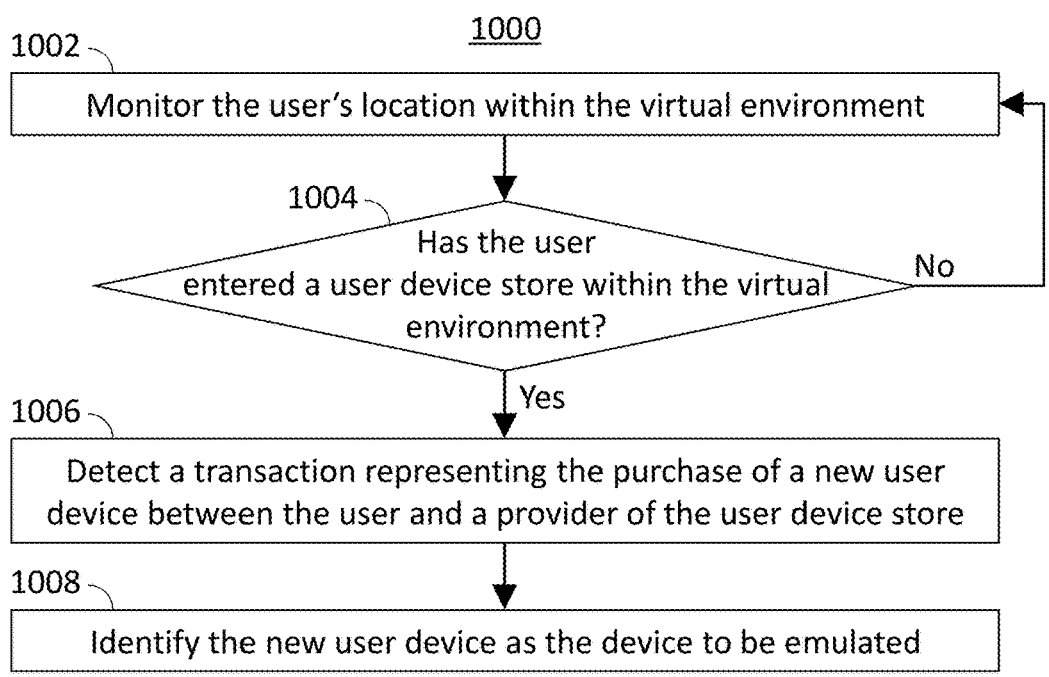
FIG. 10 is a flowchart representing an illustrative process for identifying a user device to be emulated based on a transaction within a user device store within a virtual environment, in accordance with some embodiments of the disclosure.

FIG. 10 is a flowchart representing an illustrative process 1000 for identifying a user device to be emulated based on a transaction within a user device store within a virtual environment, in accordance with some embodiments of the disclosure. Process 1000 may be implemented on control circuitry 510. In addition, one or more actions of process 1000 may be incorporated into or combined with one or more actions of any other process or embodiments described herein.

At 1002, control circuitry 510 monitors the user's location within the virtual environment. For example, control circuitry 510 may examine metadata associated with the location at which the user is currently located. In some embodiments, virtual content streams for different portions of the virtual environment, such as virtual stores, virtual concerts, virtual art galleries, etc., may be served by different servers, each associated with the provider of the virtual store, virtual concert, virtual art gallery, etc. For example, a virtual concert organized and provided by iHeart Media may be served from a server owned and operated by iHeart Media and may be located within the iheart.com domain. Similarly, a virtual Apple store may be served from a server owned and operated by Apple and be located within the apple.com domain. Control circuitry 510 may monitor the domains or providers of servers from which content is being streamed to the user.

At 1004, control circuitry 510 determines whether the user has entered a user device store within the virtual environment. For example, control circuitry 510 may determine that the content being streamed to the user is provided by a user device manufacturer (e.g., Apple). If the user has not entered a user device store ("No" at 1004), then processing returns to 1002, where control circuitry 510 continues to monitor the user's location within the virtual environment. If the user has entered a user device store within the virtual environment ("Yes" at 1004), then, at 1006, control circuitry 510 detects a transaction representing the purchase of a new user device between the user and a provider of the user device store. For example, control circuitry 510 may detect a payment token or order confirmation object exchanged between the XR device and the server providing the user device store. At 1008, control circuitry 510 identifies the new user device as the device to be emulated. For example, control circuitry 510 may determine from an order confirmation or from the user's purchase history whether the user purchased a user device and the make and model of the user device purchased. Control circuitry 510 then identifies the newly purchased user device as the device to be emulated.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
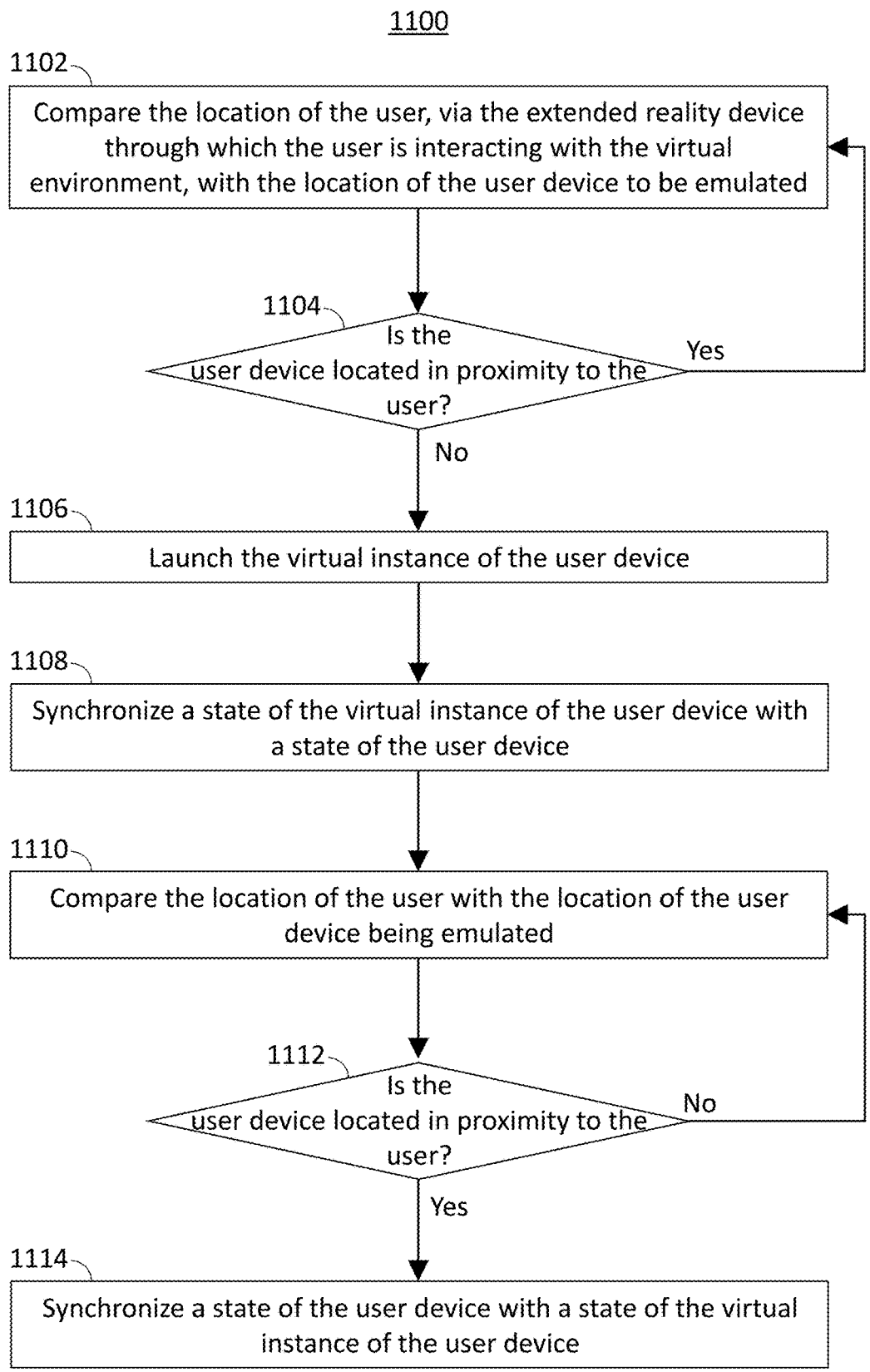
FIG. 11 is a flowchart representing an illustrative process for launching a virtual instance of a user device and synchronizing states between the virtual instance and the user device, in accordance with some embodiments of the disclosure.

FIG. 11 is a flowchart representing an illustrative process 1100 for launching a virtual instance of a user device and synchronizing states between the virtual instance and the user device, in accordance with some embodiments of the disclosure. Process 1100 may be implemented on control circuitry 510. In addition, one or more actions of process 1100 may be incorporated into or combined with one or more actions of any other process or embodiments described herein.

At 1102, control circuitry 510 compares the location of the user, via the XR device through which the user is interacting with the virtual environment, with the location of the user device to be emulated. For example, using the XR device as a proxy for the user themselves, control circuitry 510 may access location services of the XR device to determine an exact location of the XR device. Control circuitry 510 may also access location services of the user device to determine an exact location of the user device. Control circuitry 510 may then compare the two locations to determine a distance between them. Alternatively or additionally, one or both of the XR device and the user device may use signal strength of a wireless communication connection between them to determine a distance by which they are separated. Control circuitry 510 may retrieve this distance from either device.

At 1104, control circuitry 510 determines whether the user device is located in proximity to the user. For example, control circuitry 510 may have a set threshold distance below which devices are considered to be in proximity to one another, such as two meters. Again, using the XR device as a proxy for the user, control circuitry 510 may compare the distance between the user device and the XR device to the threshold distance. If the distance between the two devices is below the threshold, the devices are considered to be in proximity to one another, thus indicating that the user device is in proximity to the user. If the user device is in proximity to the user ("Yes" at 1104), then processing returns to 1102, where control circuitry 510 compares the locations of the two devices.

If the user device is not located in proximity to the user ("No" at 1104), then, at 1106, control circuitry 510 launches the virtual instance of the user device. This may be accomplished using methods described above in connection with FIG. 6. At 1108, control circuitry 510 synchronizes a state of the virtual instance of the user device with a state of the user device. For example, the user device may be running an application, such as a music player, and outputting audio content (i.e., music) as well as displaying visual content related to the audio content (e.g., song title, artist name, album art, etc.). Control circuitry 510 applies this state of the user device to the virtual instance of the user device so that both the user device and the virtual instance of the user device are in the same state at the same time. Other states, such as battery status, display brightness, volume output level, etc. may also be synchronized. Thus, if the user interacts with the user device, the virtual instance of the user device will reflect the interaction.

At 1110, control circuitry 510 again compares location of the user with the location of the user device and, at 1112, determines whether the user device is located in proximity to the user, as discussed above. If the user device is no longer in proximity to the user ("No" at 1112), then processing returns to 1110 where control circuitry 510 continues to compare the location of the user device with the location of the user. If the user device is in proximity to the user ("Yes" at 1112), then, at 1114, control circuitry 510 synchronizes a state of the user device with a state of the virtual instance of the user device. For example, while interacting with the virtual environment, the user may have moved outside the proximity threshold distance from the user device. While outside the proximity distance, the user may have interacted with the virtual instance of the user device, changing a state of the virtual instance of the user device. When the user moves back within the proximity threshold of the user device, control circuitry 510 may synchronize the state of the user device with the current state of the virtual instance of the user device. For example, control circuitry 510 may record each input to the virtual instance of the user device made by the user and transmit each input sequentially to the user device. Alternatively, control circuitry 510 may capture a system image or set of parameters representing the current state of the virtual instance of the user device and apply them to the user device.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for emulating a user device in a virtual environment generated by an extended reality device, the method comprising:
    identifying a user device associated with a user wherein the user device is separate from the extended reality device;
    launching, using an emulation application integrated with the extended reality device, a virtual instance of the user device;
    accessing, by the extended reality device, user data associated with the user device;
    applying user preferences, from the user data, to the virtual instance of the user device to generate a personalized virtual instance of the user device;
    generating, for presentation in the virtual environment, a graphical representation of the personalized virtual instance of the user device;
    determining, by the extended reality device, a user interaction with the graphical representation of the personalized virtual instance of the user device;
    transmitting an indication of the user interaction with the graphical representation of the personalized virtual instance of the user device to the user device;
    causing the user device to perform an action corresponding to the user interaction with the graphical representation of the personalized virtual instance of the user device; and
    updating the graphical representation of the personalized virtual instance of the user device based at least in part on the user interaction with the graphical representation of the personalized virtual instance of the user device.

2. The method of claim 1, wherein identifying the user device associated with the user further comprises:
    receiving a request to generate a virtual instance of a user device;
    retrieving, from a user profile associated with the user, data describing a plurality of devices associated with the user;
    determining, from the data, for each device of the plurality of devices, a device type; and
    in response to determining, for a respective device of the plurality of devices, that an emulation application for the device type of the respective device is available, identifying the respective device as the user device.

3. The method of claim 1, further comprising:
    determining device capabilities of an extended reality device through which the user is interacting with the virtual environment;
    identifying at least one emulation application for the identified user device;
    determining, based on the device capabilities, for each respective emulation application, whether the respective emulation application can run on the extended reality device; and
    in response to determining that a respective emulation application can run on the extended reality device, retrieving the respective emulation application.

4. The method of claim 1, further comprising:
    detecting completion of a purchase of a new user device;
    wherein identifying the user device associated with the user further comprises identifying, based on the purchase, the new user device.

5. The method of claim 4, wherein detecting completion of the purchase of the new user device further comprises:
    monitoring a purchase history of the user;
    detecting, based on the monitoring, a new purchase record; and
    determining, based on data associated with the new purchase record, that the new purchase record corresponds to the purchase of the new user device.

6. The method of claim 4, wherein detecting completion of the purchase of the new user device further comprises:
    determining that the user has entered a user device store within the virtual environment; and
    detecting a transaction representing the purchase of the new user device between the user and a provider of the user device store.

7. The method of claim 1, further comprising:
    determining whether the user device is currently located in proximity to the user;
    wherein launching the virtual instance of the user device occurs in response to determining that the user device is not currently located in proximity to the user.

8. The method of claim 1, further comprising synchronizing a state of the virtual instance with a state of the user device.

9. The method of claim 1, further comprising selecting a version of the virtual instance based on an extended reality device that is providing an interactive interface for the virtual environment, wherein launching the virtual instance comprises launching the selected version of the virtual instance.

10. The method of claim 1, further comprising receiving the user data for the user device at an extended reality device providing an interactive interface for the virtual environment via an intermediate device in communication with the user device.

11. A system for emulating a user device in a virtual environment generated by an extended reality device, the system comprising:
    extended reality content output circuitry; and
    control circuitry configured to:
        identify a user device associated with a user wherein the user device is separate from the extended reality device;

launch, using an emulation application integrated with the extended reality device, a virtual instance of the user device;
access, by the extended reality device, user data associated with the user device;
apply user preferences, from the user data, to the virtual instance of the user device to generate a personalized virtual instance of the user device;
generate, for presentation in the virtual environment via the extended reality content output circuitry, a graphical representation of the personalized virtual instance of the user device;
determine, by the extended reality device, a user interaction with the virtual instance of the user device;
transmit an indication of the user interaction with the graphical representation of the personalized virtual instance of the user device to the user device;
cause the user device to perform an action corresponding to the user interaction with the graphical representation of the personalized virtual instance of the user device; and
update the graphical representation of the personalized virtual instance of the user device based at least in part on the user interaction with the graphical representation of the personalized virtual instance of the user device.

12. The system of claim 11, wherein the control circuitry configured to identify the user device associated with the user is further configured to:
receive a request to generate a virtual instance of a user device;
retrieve, from a user profile associated with the user, data describing a plurality of devices associated with the user;
determine, from the data, for each device of the plurality of devices, a device type; and
in response to determining, for a respective device of the plurality of devices, that an emulation application for the device type of the respective device is available, identify the respective device as the user device.

13. The system of claim 11, wherein the control circuitry is further configured to:
determine device capabilities of an extended reality device through which the user is interacting with the virtual environment;
identify at least one emulation application for the identified user device;
determine, based on the device capabilities, for each respective emulation application, whether the respective emulation application can run on the extended reality device; and
in response to determining that a respective emulation application can run on the extended reality device, retrieve the respective emulation application.

14. The system of claim 11, wherein the control circuitry is further configured to:
detect completion of a purchase of a new user device;
wherein the control circuitry configured to identify the user device associated with the user is further configured to identify, based on the purchase, the new user device.

15. The system of claim 14, wherein the control circuitry configured to detect completion of the purchase of the new user device is further configured to:
monitor a purchase history of the user;
detect, based on the monitoring, a new purchase record; and
determine, based on data associated with the new purchase record, that the new purchase record corresponds to the purchase of the new user device.

16. The system of claim 14, wherein the control circuitry configured to detect completion of the purchase of the new user device is further configured to:
determine that the user has entered a user device store within the virtual environment; and
detect a transaction representing the purchase of the new user device between the user and a provider of the user device store.

17. The system of claim 11, wherein the control circuitry is further configured to:
determine whether the user device is currently located in proximity to the user;
wherein the control circuitry configured to launch the virtual instance of the user device is configured to do so in response to determining that the user device is not currently located in proximity to the user.

18. The system of claim 11, wherein the control circuitry is further configured to synchronize a state of the virtual instance with a state of the user device.

19. The system of claim 11, wherein the control circuitry is further configured to select a version of the virtual instance based on an extended reality device that is providing an interactive interface for the virtual environment, wherein the control circuitry configured to launch the virtual instance is further configured to launch the selected version of the virtual instance.

20. The system of claim 11, wherein the control circuitry is further configured to receive the user data for the user device at an extended reality device providing an interactive interface for the virtual environment via an intermediate device in communication with the user device.

* * * * *